United States Patent [19]  [11] 4,117,091
Kongpricha  [45] Sep. 26, 1978

[54] WET PROCESS PHOSPHORIC ACID PRODUCED USING GYPSUM-CONTAINING WASTE WATER

[75] Inventor: Santad Kongpricha, Deer Park, Tex.

[73] Assignee: Olin Corporation, New Haven, Conn.

[21] Appl. No.: 697,179

[22] Filed: Jun. 17, 1976

[51] Int. Cl.$^2$ ............................................. C01B 25/16
[52] U.S. Cl. .................................... 423/320; 423/555
[58] Field of Search ............... 423/167, 317, 319, 320, 423/555

[56] References Cited

U.S. PATENT DOCUMENTS

| | | | |
|---|---|---|---|
| 3,493,340 | 2/1970 | Bosei et al. | 423/320 |
| 3,498,746 | 3/1970 | Smaltz et al. | 423/321 |
| 3,498,747 | 3/1970 | Smaltz et al. | 423/320 |
| 3,699,212 | 10/1972 | Palm | 423/319 |

OTHER PUBLICATIONS

Phosphoric Acid–Slack, vol. 1, 1968, pp. 227–279.

*Primary Examiner*—O. R. Vertiz
*Assistant Examiner*—Eugene T. Wheelock
*Attorney, Agent, or Firm*—James B. Haglind; Donald F. Clements

[57] ABSTRACT

Diluted sulfuric acid used in the production of wet process phosphoric acid is obtained by the admixing of gypsum-containing waste water with concentrated sulfuric acid and subsequently cooling in a liquid-to-liquid heat exchanger. By maintaining the concentration of the diluted acid at from about 65 to 80% $H_2SO_4$, harmful formation of scale in the heat exchanger is prevented. The process permits the recovery of $P_2O_5$ values from gypsum-containing waste waters and does not require expensive dilution tanks or flash coolers.

4 Claims, No Drawings

WET PROCESS PHOSPHORIC ACID PRODUCED USING GYPSUM-CONTAINING WASTE WATER

This invention relates to the manufacture of wet process phosphoric acid. More particularly, this invention relates to the recycling of a waste water stream to recover material values and reduce pollution of waterways in the manufacture of phosphoric acid.

The manufacture of phosphoric acid by the wet process employs voluminous amounts of water in, for example, the sulfuric acid dilution and product recovery stages. During processing, a large portion of the water ends up in a gypsum slurry containing considerable amounts of $P_2O_5$, sulfuric acid, gypsum, as well as varying amounts of fluoride and other components. This gypsum slurry is routinely passed to a large gypsum pond where insoluble materials settle out and a waste solution remains containing soluble $P_2O_5$ values along with dissolved gypsum.

Because of the amounts of waste solution produced at present, it is usually necessary to re-use a portion of this waste solution to recover the economically valuable $P_2O_5$, to reduce fresh water requirements, and to avoid polluting other water sources in the area.

It is known to use gypsum pond water in the dilution of sulfuric acid, as described in U.S. Pat. No. 3,498,746, issued March 3, 1970, to R. G. Smaltz et al. In this process, a portion of the concentrated sulfuric acid employed and pond water are mixed in a pre-dilution tank to precipitate $CaSO_4$ crystals. This acid solution is then passed to a dilution tank where it is mixed with the rest of the concentrated acid to form a diluted acid containing from about 25 to 70% sulfuric acid.

Similarly, U.S. Pat. No. 3,498,747, issued March 3, 1970, to R. G. Smaltz et al. employs as the dilution tank a large carbon brick reactor.

Both of the above processes require at least one special reactor in which to carry out the dilution of the sulfuric acid with the pond water prior to cooling the acid and feeding it to the phosphate rock digestors. These reactors are an added expense in terms of purchase price and maintenance costs for scale removal and also allow the loss of heat generated during the dilution reaction.

Therefore, there is need for a process which does not require a special dilution reactor and avoids the harmful buildup of scale while employing standard heat transfer equipment.

It is an object of the present invention to provide a process for producing phosphoric acid in which $P_2O_5$ values are recovered from waste solutions.

An additional object of the present invention is to provide a process for phosphoric acid in which a harmful formation of scale in acid dilution reactors and cooling heat exchangers is prevented.

An added object of the present invention is to provide a process for phosphoric acid having reduced requirements for fresh water.

A further object of the present invention is to provide a process for phosphoric acid which avoids the pollution of natural resources.

These and other objects of the invention will be apparent from the following detailed description of the invention.

Briefly, in a process for producing phosphoric acid by the digestion of phosphate rock with diluted sulfuric acid obtained by the dilution of concentrated sulfuric acid with gypsum-containing waste water, the improvement comprises:

a. introducing the concentrated acid solution into a mixing zone;
b. admixing sufficient amounts of the gypsum-containing waste water with the concentrated acid solution in said mixing zone to produce a diluted acid solution containing from about 65 to 80% by weight of $H_2SO_4$;
c. cooling the diluted acid solution in a liquid-to-liquid heat exchanger, the heat exchanger being kept substantially free of scale during the cooling of the diluted acid solution; and
d. feeding the diluted acid solution directly to a digestion reactor containing phosphate rock to produce phosphoric acid.

Gypsum is produced in large quantities as a by-product in the production of wet phosphoric acid. Phosphate rock slurry in phosphoric acid is usually first acidulated by digestion with aqueous sulfuric acid. The calcium phosphate of the rock is converted to phosphoric acid and calcium sulfate dihydrate or gypsum, which is usually separated by filtration. Gypsum filter cake is washed thoroughly to recover $P_2O_5$ values. The cake is then slurried with water and pumped to waste storage where the solids are deposited and the liquid drains away to form a waste water pond. The waste water is an aqueous solution containing $P_2O_5$ values, sulfuric acid, gypsum, fluorides, and chlorides. Concentrations of gypsum, expressed in terms of CaO, found in the waste water can range from about 1,000 to about 3,000, and more generally are found to be from about 1,800 to about 2,300 parts per million of CaO.

Sulfuric acid, at a concentration of above 80%, preferably above 82%, and more preferably above 90% $H_2SO_4$ by weight, is admixed with gypsum-containing waste water in a mixing zone to form a diluted acid solution containing from about 65% to 80%, preferably from about 65% to about 78%, and more preferably from about 70% to about 75% by weight of $H_2SO_4$.

The mixing zone, for example, the heat exchanger itself, a mixing pipe or mixing tee, assures adequate mixing of the concentrated acid and the gypsum-containing waste water so that the diluted acid solution produced is of a uniform concentration and within the desired concentration limits.

In a preferred embodiment, the concentrated acid and the gypsum-containing waste water are admixed in a mixing tee prior to being introduced into the heat exchanger. The diluted acid is not retained in the mixing zone but is fed directly to the heat exchanger.

During dilution large amounts of heat are produced which are transferred to a cooling liquid, usually water, in a liquid-to-liquid heat exchanger. This heat may be utilized, for example, to evaporate additional waste water.

Any suitable liquid-to-liquid heat exchanger, for example, a double pipe or shell-and-tube exchanger, may be used to cool the diluted acid. The shell-and-tube type is a well-known form of heat exchanger. In such units, one fluid passes inside a plurality of tubes contained in a shell, with the other fluid passing through the shell. For example, the diluted acid solution may be passed through either the tubes or the shell side; it is preferred, however, to pass the diluted acid solution through the tubes. Any suitable liquid may be used as the cooling medium with water being preferred for economic reasons. The water used may be a waste solution which is partially evaporated by the heat of dilution of the concentrated acid to reduce the amounts of waste solution to be disposed of by other methods.

The diluted acid solution is rapidly cooled to a temperature of from about 100° to about 160° F, and preferably from about 120° to about 140° F and fed directly to the phosphate rock digestors. Retention time of the diluted acid in the heat exchanger is short, for example, about 1-2 minutes, and is usually less than five minutes.

Accurate control of the temperature of the diluted $H_2SO_4$ is required to minimize heat evolution during reaction with phosphate rock. Excessive temperature during digestion results in the formation of calcium sulfate hemihydrate rather than the dihydrate and hemihydrate formation is accompanied by an increased loss of $P_2O_5$ values and is difficult to filter and wash.

When employing diluted sulfuric acid having concentrations in the required range of from about 65 to 80% $H_2SO_4$, it is believed that substantial amounts of scale are not produced on the surfaces of the heat exchanger because the sulfuric acid is ionized substantially as the bisulfate ion ($HSO_4^-$) and a proton rather than the sulfate ion ($SO_4^=$). The calcium present reacts to form primarily the soluble calcium bisulfate with minor amounts of the insoluble calcium sulfate being present.

In the digestor reactor, the diluted acid is reacted with phosphate rock and the $P_2O_5$ and fluoride values in the diluted acid are recovered. The phosphoric acid is produced and recovered in known ways.

The process permits the recovery of $P_2O_5$ values from gypsum-containing waste waters and does not require expensive dilution tanks or flash coolers.

The process of the present invention is further illustrated by the following examples. All parts and percentages are given by weight unless otherwise specified.

EXAMPLE 1

Concentrated sulfuric acid containing 93% by weight of $H_2SO_4$ was continuously pumped to a mixing tee. Also continuously added to the mixing tee was gypsum pond water containing about 0.9% by weight of $P_2O_5$, about 0.2% by weight of CaO (2,000 ppm), and about 0.4% $H_2SO_4$ and having a pH of about 2.3. Sufficient amounts of gypsum pond water were added to the concentrated acid to produce a diluted acid having about 72% by weight of $H_2SO_4$. The diluted acid at a temperature of about 265° F was then cooled in a shell-and-tube heat exchanger through which cooling water flowed on the shell side. The diluted acid, at an exit temperature of about 140° F, was fed directly to a digestion tank containing ground phosphate rock to produce wet phosphoric acid and by-product calcium sulfate hemihydrate. The process was operated for five days, during which the following data was obtained periodically:

The temperature of the cooling water at the inlet and at the outlet of the heat exchanger, the flow rate of the cooling water, the tube side pressures at the inlet and outlet of the heat exchanger, and the outlet temperature of the diluted acid. During this period, heat transfer coefficients were calculated, compared with the diluted acid flow rate, and found not to decrease with time. Tube side pressure drops gave no indication of scale buildup. Inspection of the cooler showed only a few light areas of scale buildup on the cooler tube sheet.

EXAMPLE 2

The procedure of Example 1 was repeated for five days employing flow rates of concentrated $H_2SO_4$ and gypsum pond water required to produce diluted acid having 67% by weight of $H_2SO_4$. Analysis of tube side pressure drops and heat transfer coefficients gave no evidence of excessive scaling. Inspection of the heat exchanger showed a scale buildup of about 1/32 of an inch over about ⅓ of the cooler head and tube sheet.

EXAMPLES 3-4

Concentrated sulfuric acid (100 parts of 93% by weight of $H_2SO_4$) was added to two separate reaction vessels. Varying amounts of gypsum pond water of the same composition as used in Example 1 were added to produce diluted sulfuric acid solutions having 70% and 80% by weight of $H_2SO_4$. During the mixing of the liquids and for two minutes after addition, the mixture was stirred to dissipate heat and to provide a homogeneous solution. Each solution was allowed to cool to a temperature of 140° F. At this temperature, an examination was made for the formation of a precipitate in the reaction vessel. No precipitate was formed in either of the reaction vessels.

Comparative Tests A and B

The procedure of Examples 3-4 was repeated adding sufficient quantities of gypsum pond water to two reaction vessels to dilute the concentrated $H_2SO_4$ to solutions containing 50% and 60% by weight of $H_2SO_4$ respectively. Examination of the solutions after they had cooled to 140° F showed the formation of a precipitate in both reaction vessels.

What is claimed is:

1. In a process for producing phosphoric acid by the digestion of phosphate rock with diluted sulfuric acid obtained by the dilution of concentrated sulfuric acid with gypsum-containing waste water having a CaO concentration of from about 1,000 to 3,000 parts per million, the improvement which comprises:
   a. introducing said concentrated sulfuric acid into a mixing tee;
   b. admixing sufficient amounts of said gypsum-containing waste water with said concentrated sulfuric acid in said mixing tee to produce a diluted acid solution containing from about 70 to about 75 percent by weight of $H_2SO_4$;
   c. cooling said diluted acid solution in a liquid-to-liquid heat exchanger, said heat exchanger remaining substantially free of gypsum scale as a result of the combination of calcium concentration, $H_2SO_4$ concentration, and temperature therein; and
   d. feeding said diluted acid solution directly to a digestion reactor containing said phosphate rock to produce said wet phosphoric acid.

2. The process of claim 1 in which said diluted acid solution is cooled to a temperature of from about 100° to about 160° F.

3. The process of claim 2 in which said liquid-to-liquid heat exchanger is a shell-and-tube heat exchanger.

4. The process of claim 3 in which said diluted acid solution is cooled to a temperatue of from about 120° to about 140° F.

* * * * *